United States Patent [19]

Reinartz et al.

[11] Patent Number: 4,815,793
[45] Date of Patent: Mar. 28, 1989

[54] HYDRAULIC BRAKE SYSTEM FOR AUTOMOTIVE VEHICLES

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt, Fed. Rep. of Germany

[21] Appl. No.: 89,725

[22] Filed: Aug. 26, 1987

[30] Foreign Application Priority Data

Sep. 2, 1986 [DE] Fed. Rep. of Germany ....... 3629776

[51] Int. Cl.$^4$ ........................... B60T 8/44; B60T 8/32
[52] U.S. Cl. .................................... 303/114; 303/113; 303/116; 303/119
[58] Field of Search .............. 303/113, 114, 119, 116, 303/110, 6 A, 6 C, 87, 6.01, 9.62, 9.61; 188/181 A

[56] References Cited

U.S. PATENT DOCUMENTS

| | | | |
|---|---|---|---|
| 3,291,538 | 12/1966 | Bulgin | 303/113 |
| 4,206,950 | 6/1980 | Elliott | 303/110 |
| 4,415,210 | 11/1983 | Belart et al. | 303/6 C |
| 4,482,190 | 11/1984 | Burgdorf et al. | 303/119 |
| 4,641,895 | 2/1987 | Belart et al. | 303/114 |

FOREIGN PATENT DOCUMENTS

| | | | |
|---|---|---|---|
| 0199352 | 10/1986 | European Pat. Off. | |
| 2573019 | 5/1986 | France | |
| 2574356 | 6/1986 | France | |
| 2147962 | 5/1985 | United Kingdom | 303/87 |
| 2160276 | 12/1985 | United Kingdom | |
| 2167822 | 6/1986 | United Kingdom | |

Primary Examiner—Andres Kashnikow
Assistant Examiner—Mark T. Le
Attorney, Agent, or Firm—James B. Raden

[57] ABSTRACT

A hydraulic brake system for automotive vehicles has a master brake cylinder (1) operable by a brake pedal, wheel brakes (VL, HR, VR, HL) being connected to said master brake cylinder via brake lines (11, 12), and a hydraulic power booster (22) supplied by a pressure medium source (42) and connected between the brake pedal and the master brake cylinder (1) so as to boost the actuating force. The booster has a booster piston (27) in a booster chamber (28) and the pressurization of said booster piston is controllable by the brake pedal via a control piston (30). For controlling the brake system by means of a brake slip control device the connection from the brake lines (11, 12) to the wheel brakes can be blocked by solenoid valves (13–16). The booster piston (27) is connected with a resetting piston which, for pushing the booster piston back into its rest position, is pressurizable via a resetting valve (46, 53) controllable by the brake slip control device. For brake slip control the master cylinder (1) is actuatable intermittently by means of a drive piston (39), with the booster piston moved back. The actuating movement of said drive piston is controllable by the brake slip control device via solenoid valves (48, 55). A traction slip control device can connect the cylinder chamber (38) of the drive piston (39) with the pressure medium source (42) via a solenoid valve (50) and a pressure reducing valve (51) and also with the unpressurized reservoir (44) via a solenoid valve (48).

4 Claims, 2 Drawing Sheets

HYDRAULIC BRAKE SYSTEM FOR AUTOMOTIVE VEHICLES

BACKGROUND OF THE INVENTION

This invention relates to a hydraulic brake system for automotive vehicles and, more particularly, to such a system having a master brake cylinder operable by a brake pedal, wheel brake cylinders connected to the master brake cylinder via one or several brake lines, a hydraulic power booster connected between the brake pedal and the master brake cylinder and supplied by a pressure medium source so as to boost the actuating force. The system also has a booster piston in a booster chamber and the pressurization of the booster piston is controllable by the brake pedal. Finally, the system has a valve arrangement which is connected into one brake line or into several brake lines and which is controllable by a brake slip control device by means of which the brake line can be blocked.

In hydraulic brake systems of this type each of the wheel brake cylinders is connected to the brake line via a solenoid valve which is open when de-energized (currentless) and to a return line, leading to an unpressurized reservoir, via a solenoid valve which is closed when de-energized (currentless). The solenoid valves are controllable by the brake slip control device. When a lock-up tendency appears at any one of the wheel brakes, the solenoid valves associated with its wheel brake cylinder are actuated by the brake slip control device, whereby, the connection from the wheel brake cylinder to the brake line is blocked. At the same time pressure medium is tapped from the wheel brake cylinder into the return line so that the pressure in the wheel brake cylinder will drop. So as to be able to subsequently build up the pressure again in the wheel brake cylinder, the solenoid valves are switched back and the wheel brake cylinder again will be separated from the return line and connected with the brake line. Now the wheel brake cylinder again will receive pressure medium from the brake line until the pressures will have adapted to one another and the control cycle will start over again. So as to make available the pressure medium amount required for such a control, in these brake systems the working chamber of the master brake cylinder or the brake line will be connected with the booster chamber via suitable valve arrangements at the onset of brake slip control. At the same time, a positioning sleeve will be pressurized which thereby will keep the booster piston and, hence, the pistons of the master brake cylinder, too, in a position in which the pistons of the master brake cylinder will still be able to effect a sufficient actuating stroke for carrying out an emergency braking operation.

These brake systems are disadvantageous in that the hydraulic power booster and the master brake cylinder as well as the wheel brake cylinders connected downstream of the master brake cylinder require the same pressure medium. Further, part of the brake system may fail when a solenoid valve connected between wheel brake cylinder and return line jams in its open position.

SUMMARY OF THE INVENTION

It is thus an object of this invention to provide a hydraulic brake system of the type referred to above where the pressure medium circuits of power booster and master brake cylinder remain separated during the entire operation in order to thus increase the operational reliability of the brake system. Further, transmission of pressure variations and piston movements to the brake pedal is avoided during brake slip control.

According to this invention, this object is provided in that the booster piston is connected with a resetting piston arranged in a resetting cylinder and arranged so that it can be pressurized in the brake's release direction via a resetting valve controllable by the brake slip control device. The resetting force which can be generated by the resetting piston exceeds the actuating force at the booster piston. Between the booster piston and the master brake cylinder a drive piston is arranged in a separate cylinder chamber which is alternatively connectible with the booster chamber or with an unpressurized reservoir via a valve device controllable by the brake slip control device. Thus a hydraulic brake system is provided which is controllable by a brake slip control device and which is characterized by a simple structure and a high-degree of operational reliability. As the decrease and reincrease of the braking pressure for brake slip control are effected by alternating release and operation of the master brake cylinder and as the master brake cylinder is directly actuable in a mechanical manner at any time by the brake pedal, the brake system will always remain ready for operation in case of trouble in brake slip control as well as in case of failure of the brake boosting action. The brake lines connected to the master brake cylinder and the wheel brake cylinders form a hydraulically closed system which is connectible with an unpressurized reservoir only via the central valves of the master brake cylinder. Thus, there are no further valve-controlled outlets by which braking pressure could escape during brake application.

The hydraulic supply of the power booster and of the drive piston for brake slip control is completely separated from the master brake cylinder and from the brake circuits connected to the master brake cylinder and thus can be operated with another pressure medium. So, for instance, it is advantageous to use a mineral oil for the pressure medium supply to the power booster and for the pressurization of the driven piston as this mineral oil has favorable greasing properties and increases the life of the pump aggregate in particular. The master brake cylinder and the connected brake circuits, on the other hand, will be filled with brake fluid rated for the temperature strain within the brake system.

So as to prevent the controlled actuating movements of the master brake cylinder from being felt at the brake pedal during brake slip control, the resetting piston is provided for moving the booster piston and the brake pedal back into the initial position during control. This operation signals the driver that brake slip control has come on. During this action, the driver continues to be able to control the pressure in the booster chamber and, hence, also the actuating pressure in the brake system by means of the applied actuating force.

According to one embodiment of this invention the resetting piston is pressurizable by the pressure in the booster chamber, and its hydraulic effective surface exceeds the hydraulic effective surface of the booster piston. This is advantageous as the resetting piston will remain effective as long as a pressure has been built up in the booster chamber.

For controlling the resetting piston, the resetting cylinder can be connected with an unpressurized reservoir via a solenoid valve open when de-energized (currentless) and with the booster chamber via a solenoid valve closed when de-energized (currentless) with the two solenoid valves being jointly actuatable by the brake slip control device.

So as to maintain the transmission ratio between the brake pedal and the master cylinder piston also during brake slip control, the hydraulic effective surface of the drive piston equals the hydraulic effective surface of the booster piston. As the drive piston is likewise pressurized by the pressure of the booster chamber, the ratio between the actuating force at the brake pedal and the maximum braking pressures within the brake system will also remain unchanged during brake slip control.

The inventive brake system is also suited for traction slip control when the vehicle is starting to move. To this end, according to this invention, the cylinder chamber of the drive piston is connectible to the pressure medium source via a valve controllable by a traction slip control device and to the unpressurized reservoir by the actuation of the valve device controllable by the brake slip control device, with the valves connected in the brake line upstream of the wheel brake cylinders of the driving wheels of the vehicle being controllable by the traction slip control device. Thus, the inventive brake system has the advantage of needing only one additional valve for traction slip control. So as to keep up a pressure level favorable for traction slip control, according to this invention, a pressure reducing valve is connected upstream of the valve controllable by the traction slip control device.

According to a further aspect of this invention, the valve arrangement connected into the brake line has solenoid valves which are open when de-energized (currentless). Out of these solenoid valves, one at a time is connected upstream of one wheel brake cylinder, with a non-return valve being provided in parallel connection to each solenoid valve. The non-return valve opens toward the master brake cylinder and can be locked at the onset of brake slip control. Thereby the operational reliability of the brake system is increased. When a solenoid valve is jammed, the braking pressure can be decreased toward the master brake cylinder via the non-return valves as soon as the non-return valves have been unlocked by the de-activation of brake slip control.

Preferably, the control inlets of the lockable non-return valves are connected to the resetting cylinder. The non-return valves thus only will be locked when pressure is built up in the resetting cylinder at the onset of brake slip control.

According to a further embodiment of this invention, the lockable non-return valves contain a ball-type seat valve whose valve ball is acted upon in the closing direction by a stepped locking piston whose large piston front face acted upon in the locking direction exceeds the effective valve seat surface in size.

So as to delay the resetting movement of the resetting piston and to avoid surges at the brake pedal, a throttle is arranged between the resetting cylinder and the resetting valve. Further, a chamber is provided between the drive piston and the master brake cylinder, which chamber communicates with the atmosphere and by means of which the different pressure media in the master brake cylinder and in the booster circuit will be prevented from mixing even in case of leakages.

BRIEF DESCRIPTION OF THE DRAWING

In the following, this invention will be explained in more detail with reference to the embodiment illustrated in the drawing, in which.

DETAILED DESCRIPTION OF PREFERRED EMBODIMENTS

Figure 1:
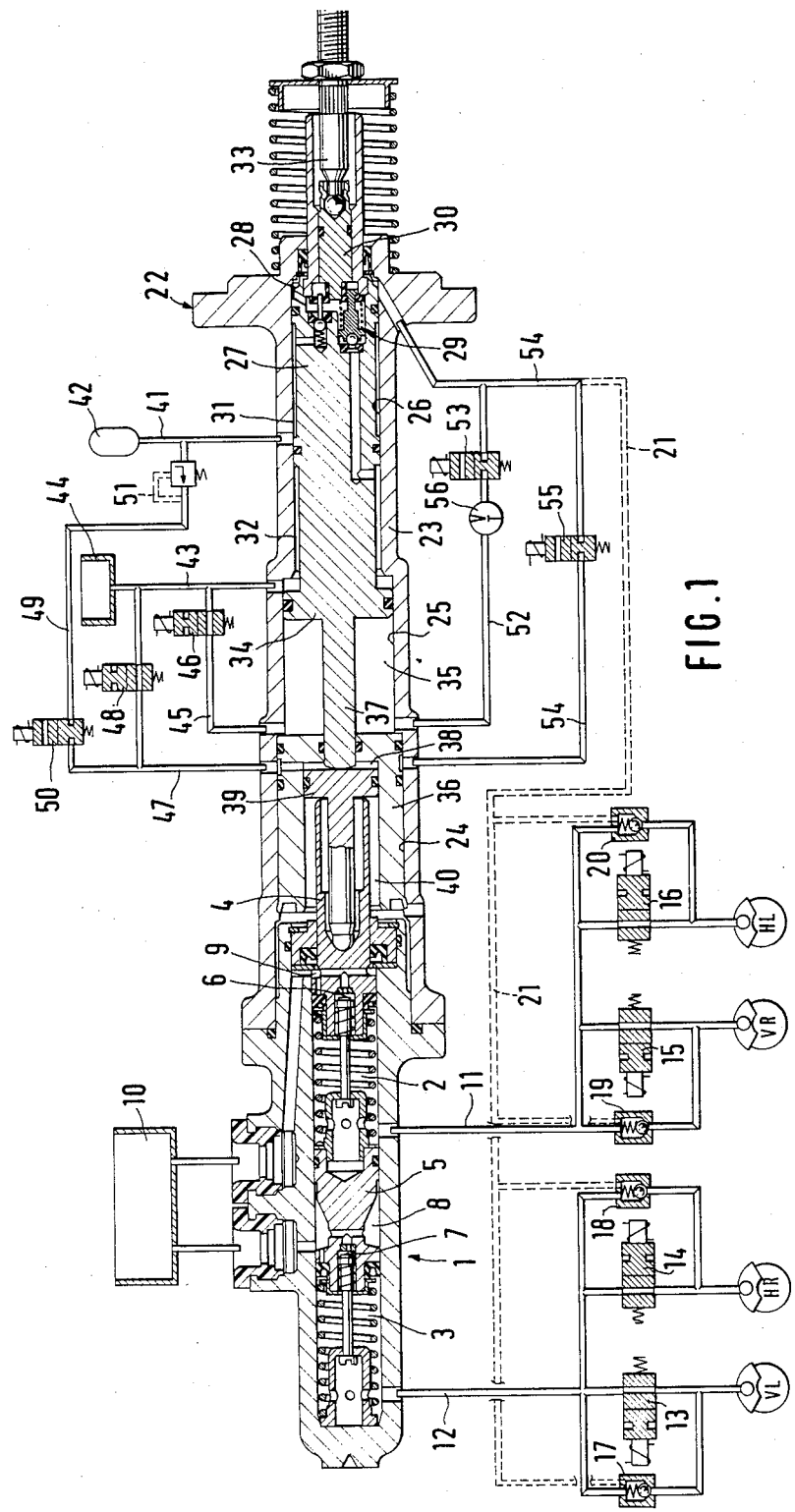
FIG. 1 is a schematic diagram of a brake system in accordance with
this invention with a longitudinal section taken through the
braking pressure generator which comprises a master brake
cylinder and power booster.

The hydraulic brake system illustrated in FIG. 1 includes a tandem master brake cylinder 1 with two separate working chambers 2, 3 which can be reduced in size by an actuating stroke of a push-rod piston 4 and of a floating piston 5. A central valve 6 is arranged in the push-rod piston 4 and a central valve 7 is arranged in the floating piston 5. In their illustrated basic positions, the central valves 6, 7 are open and connect the working chambers 2, 3 with supply chambers 8, 9 connected to an unpressurized supply reservoir 10.

Separate brake lines 11, 12 lead from the working chambers 2, 3 of the tandem master brake cylinder 1 to solenoid valves 13, 14, 15, 16 which are open when de-energized (currentless) and which are preferably arranged within a valve block. The left front wheel brake VL of a vehicle is connected to a solenoid valve 13; the right rear wheel brake HR is connected to solenoid valve 14; the right front wheel brake VR is connected to solenoid valve 15; and the left rear wheel brake HL is connected to solenoid valve 16. Connected in parallel with each solenoid valve 13 through 16 is a lockable non-return valve 17, 18, 19, 20. The non-return valves 17 through 20 are connected to a common control line 21 and can be pushed open in the direction of the tandem master brake cylinder 1 by the pressure in the wheel brake cylinders of the wheel brakes VL, HR, VR, HL when the control line 21 is not pressurized.

The tandem master brake cylinder 1 is arranged with a hydraulic power booster 22. The power booster 22 comprises a cylindrical housing 23 with a stepped central bore having a larger bore section 24, a medium bore section 25, and a smaller bore section 26 arranged one after the other (from left to right in FIG. 1). In the bore section 26 there is a booster piston 27 confining a booster chamber 28 at the end of the housing 23 which is opposite to the tandem master brake cylinder 1. The booster piston 27 contains a valve device 29 actuatable via a control piston 30 and alternatively connecting the booster chamber 28 with a pressure chamber 31 or a return flow chamber 32. The pressure chamber 31 and the return flow chamber 32 are formed by annular grooves in the surface area of the booster piston 27. For the actuation of the valve device 29, the control piston 30 is connected with a non-illustrated brake pedal via a push rod 33.

In the medium bore section 25 there is a resetting piston 34 designed in one piece with the booster piston 27. The outside diameter of said resetting piston 34 is larger than the outside diameter of the booster piston 27. The resetting piston 34 separates a resetting chamber 35 from the return flow chamber 32. On its side opposite the resetting piston 34, the resetting chamber 35 is confined by a cylinder housing 36 inserted into the bore section 24 and fastened there by means of a positive connection. A piston rod 37, integrally formed with the resetting piston 34, penetrates into a cylinder chamber 38 within the cylinder housing 36 and rests there adjacent a drive piston 39 closing the cylinder chamber 38 on the side facing the tandem master brake cylinder 1. The drive piston 39 has a piston rod via which it directly acts on the push-rod piston 4. Between the drive piston 39 and the end of the tandem master brake cylinder 1 there is a chamber 40 communicating with the atmosphere.

The pressure chamber 31 is connected to a pressure accumulator 42 via a pressure line 41. The pressure accumulator 42 is charged by a non-illustrated pump aggregate. The return flow chamber 32 is connected to an unpressurized reservoir 44 via return line 43. A line 45 branches off from the return line 43 and leads to the resetting chamber 35 via a solenoid valve 46 which is open when de-energized. Via a solenoid valve 48 which is also open when de-energized another line 47 leads from the return line 43 to the cylinder chamber 38 behind the drive piston 39. Parallel to the solenoid valve 48, the cylinder chamber 38 is connected with the pressure line 41 of the pressure accumulator 42 via a pressure line 49. In the pressure line 49 there are a solenoid valve 50, which is closed when de-energized and a pressure reducing valve 51, the two valves being arranged in series.

From the booster chamber 28, a connection line 52 leads to the resetting chamber 35 via a solenoid valve 53 which is closed when de-energized and via a throttle 56. A connection line 54 leads from the booster chamber 28 to the cylinder chamber 38 via a solenoid valve 55 which is closed when de-energized. The control line 21 also directly communicates with the booster chamber 28 via a section of the connection line 54.

Figure 2:
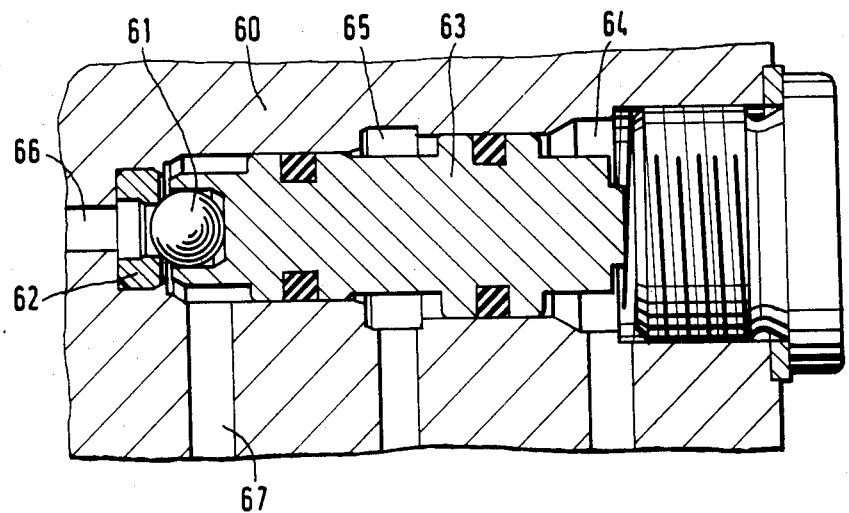
FIG. 2 is a longitudinal section taken through a lockable non-return
valve which can be used in the system of FIG. 1.

FIG. 2 represents the section through an embodiment of the lockable non-return valves 17 through 20. In a housing 60, a ball-type seat valve is arranged with a valve ball 61 and a valve seat ring 62. The valve ball 61 is located in a recess formed in the front face of a stepped locking piston 63 which, by means of a smaller front face, acts on the valve ball 61 in the closing direction. The larger front face of the locking piston 63 lies in a control chamber 64 connected to the control line 21. An annular chamber 65 between the two stages of the locking piston 63 communicates with the atmosphere. The ball-type seat valve communicates with the wheel brake cylinder of a wheel brake via a central connection 66 and with the brake lines 11 or 12, which lead to the tandem master brake cylinder 1, via a radial connection 67. When the control chamber 64 is unpressurized the valve ball 61 can be pushed open by a pressure at the connection 66 while a pressure at the connection 67 will press the valve ball 61 against the valve seat ring 62, so that the valve passage 66 is closed. When the control chamber 64 is pressurized, the pressure force acting on the locking piston 63 in the closing direction is great enough to keep the valve ball 61 seated on the valve seat ring 62 against the pressures at the connections 66 and 67. In this case the valve remains closed.

The described brake system, on the one hand, is provided for normal braking operations where the actuating force applied to the brake pedal is boosted by the power booster 22. In such braking operations, the power booster 22 operates in the usual manner and the solenoid valves 13 through 16, 46, 48, 50, 53 and 55 remain in the positions shown in FIG. 1 during the entire braking operation. In this position, the resetting chamber 35 and the cylinder chamber 38 are connected to the reservoir 44 and thus remain unpressurized. The braking pressure which, in this position, is generated in the working chambers 2, 3 of the tandem master cylinder 1 reaches the wheel brakes VL, HR, VR, HL, unhindered, via the brake lines 11, 12 and via the solenoid valves 13 through 16, which are open in their basic positions, and is decreased in the same way toward the tandem master cylinder 1 upon the brake's release.

In order to prevent the wheel brakes from locking during strong braking operations the brake system further is connected to an electric brake slip control device (not illustrated) which, via sensors, (not illustrated) monitors the rotation of the wheels of the vehicle and which in case of a lock-up tendency of any one wheel brake controls the solenoid valves 13 through 16, 46, 48, 53, and 55 in accordance with a predetermined control process. With the brake slip control device working, there will result the following mode of operation:

This initial situation for the coming-on of brake slip control is a braking operation where the wheel brakes VL, HR, VR, HL are applied with a certain pressure. In doing so, the booster piston 27 with the resetting piston 34, the drive piston 39, the push-rod piston 4, and the floating piston 5 are displaced in the actuating direction and a pressure is supplied into the booster chamber 28. This pressure keeps the booster piston 27 in its operating position and simultaneously supports the control piston 30 against the actuating force applied to the brake pedal. When the brake slip control device, detects a lock-up tendency, for example, at the left front wheel brake VL, the solenoid valves 14 through 16 and 46 and 53 are actuated. Thereby the wheel brakes HR, VR, HL are separated from the brake lines 11, 12. Further the connection from the resetting chamber 35 to the return line 43 and to the reservoir 44 via the line 45 is interrupted and the resetting chamber 35 as well as the control line 21 are connected with the booster chamber 28 via the connection line 52. The pressure metered into the booster chamber 28 thereupon acts on the resetting piston 34 which, due to its larger effective surface, moves the booster piston 27 and, also the control piston 30 and the brake pedal into their initial positions. The push-rod piston of the tandem master brake cylinder 1 follows this movement so that the pressure in the working chambers 2, 3 and the brake lines 11, 12 is decreased completely. This pressure decrease also becomes effective at the left front wheel brake VL as the solenoid valve 13 has remained in its open position so that the brake is released and the left front wheel can be reaccelerated. The remaining wheel brakes HR, VR, HL remain operated with the pressure metered in which is retained by the switched solenoid vales 14 through 26 and by the non-return valves 18 through 20 locked via the control line 21.

As soon as the brake slip control device detects a sufficient reacceleration of the left front wheel, the solenoid valves 48 and 55 will be actuated, thereby the cylinder chamber 38 is separated from the reservoir 44 and is connected with the booster chamber 28. The boosting pressure thereupon will act on the drive piston 39 which consequently will displace the push-rod piston 4 until the full braking pressure will have built up again in the working chambers 2, 3. The left front wheel brake VL will be actuated anew via the still open solenoid valve 13 until the afore-described operation is repeated due to a new lock-up tendency. Brake slip control in the inventive brake system thus exclusively will take place by intermittent pressure build-up and pressure decrease in the tandem master brake cylinder 1 by means of the drive piston 39, the movements of which are controlled via the solenoid valves 48 and 55. During brake slip control, the booster piston 27 will be kept in its rest position by means of the resetting piston 34 and, thus, the brake pedal, supported at the booster piston 27, will be uncoupled from the push-rod piston 4 of the tandem master brake cylinder 1 and the actuating movements of the push-rod piston 4 will not be transmitted to the brake pedal. If a lock-up tendency occurs at several wheel brakes, via the solenoid valves 14 through 16 associated with them, they likewise will be connected with the brake line 11 or 12 each time the pressure momentarily prevailing there corresponds to the control operation aimed at.

While the pressure build-up and the pressure decrease takes place intermittently in the tandem master brake cylinder 1 the wheel brakes VL, HR, VR, HL will be connected with the tandem master brake cylinder 1 via the solenoid valves 13 through 16 each time the pressure in the tandem master brake cylinder 1 exactly corresponds to the value to be achieved at the respective wheel brake.

In the intermittent actuation and release of the tandem master brake cylinder 1 there may take place a further supply of pressure medium from the supply reservoir 10 into the working chambers 2, 3. This, however, will not be disadvantageous as the pressure medium, which was sucked in the brake's release phases, can flow back again to the supply reservoir 10 via the then open central valves 6, 7.

After the termination of a brake slip control operation, for instance due to the disappearance of the lock-up tendency, the brake slip control device will continue to be in a state of readiness for some second and the solenoid valves 46, 53 will be actuated for a period of corresponding length. Thus, in case of a short pause of brake slip control the brake pedal will not be moved unnecessarily.

During brake slip control the desired braking pressure will exclusively be controlled by the actuating force at the brake pedal and, hence, at the control piston. The usually existing actuating travel of the brake pedal will become non-existent and be reduced to the very small control travel of the control piston 30.

The described brake system further can be used for control of slip at the driving wheels of the vehicle to avoid spinning of the driving wheels during acceleration. To this end, an electric traction slip control device (not illustrated) is provided by means of which the solenoid valves 13, 15 of the front wheel brakes VL, VR arranged at the driving wheels and the solenoid valves 48, 50 are actuatable. Generally, the traction slip control device is combined with the brake slip control device and registers the rotation of the driving wheels via the sensors of the traction slip control device. With the traction slip control device working, the mode of operation will be as follows:

If a slip is detected at the driving wheels when starting, the solenoid valves 13 through 16 and the solenoid valves 48, and 50 will first be actuated. Thereby all the wheel brakes VL, HR, VR, HL will be separated from the tandem master cylinder 1 which is in the brakes's release position. Further, the connection from the cylinder chamber 38 to the reservoir 44 will be interrupted and pressure medium will be supplied from the pressure accumulator 42 into the cylinder chamber 38. The pressure of said pressure medium is reduced by the pressure reducing valve 51. The drive piston 39 will actuate the push-rod piston 4 and will build up a pressure in the working chambers 2, 3 of the tandem master cylinder 1. By switching back the solenoid valve 13 or 15, the pressure now will be controlled so as to be supplied to the respective front wheel brake VL or VR so as to brake the respective spinning wheel. For reaccelerating the braked driving wheel, the solenoid valves 48, 50 will subsequently be controlled back, whereby the pressure in the cylinder chamber 38 is again decreased and the tandem master cylinder 1 again returns into the brake's release position. Thus, the connected wheel brake again can be released via the tandem master cylinder 1. This operation may be repeated intermittently in a similar manner as already described above with reference to brake slip control. The non-return valves 17 through 20 will not be locked during traction slip control as the power booster will remain unoperated and as there will be no boosting pressure available in the booster chamber 28. As a consequence, in case of simultaneous actuation of both front wheel brakes VL, VR, pressure reduction and, hence, the release of the brakes will always be synchronous. The two front wheel brakes thus can be actuated differently only during the pressure build-up phase.

The described brake system is also operative without using the lockable non-return valves 17 through 20. The lockable non-return valves 17 through 20, however, effect an increase in operational reliability as they will ensure the release of the wheel brakes even if any one of the solenoid valves 13 through 16 is jammed in its switched locking position. Further, the lockable non-return valves enable a minutely dosed pressure reduction upon the release of the brake, irrespective of the respective position of the solenoid valves 13 through 16 and thus prevent different braking pressures and different braking forces at the individual wheel brakes.

What is claimed is:

1. A hydraulic brake system for automotive vehicles, said system comprising a master brake cylinder operable by a brake pedal, wheel brake cylinders connected to said master brake cylinder via brake line system, a hydraulic power booster adapted to be supplied by a pressure medium source and connected between the brake pedal and the master brake cylinder so as to boost the actuating force, said hydraulic power booster having a booster piston in a booster chamber, in an arrangement whereby the pressurization of said booster piston is controllable by the brake pedal, a valve arrangement connected into said brake line system for controlling flow in the brake line system in response to a brake slip control device, the booster piston being connected with a resetting piston arranged in a resetting cylinder and pressurizable in the brake's release direction, a resetting valve controllable by a brake slip control device for controlling the pressure acting on the resetting piston, the resetting force generated by the resetting piston exceeding the actuating force at the booster piston, a drive piston between the booster piston and the master brake cylinder, said drive piston being arranged in a separate cylinder chamber which is alternatively connectable with the booster chamber or with an unpressurized reservoir by a valve device controllable by the brake slip control device, wherein the valve arrangement connected into said brake line system includes solenoid valves which are open when de-energized, one of the valves in said valve arrangement at a time being connected upstream of a wheel brake, a lockable non-return valve in parallel connection to each valve in said valve arrangement which lockable non-return valve opens toward the master brake cylinder and is locked at the onset of brake slip control.

2. A brake system as claimed in claim 1 wherein the lockable non-return valves include control inlets connected to the resetting cylinder.

3. A brake system as claimed in claim 1 wherein the lockable non-return valves include control inlets directly connected to the booster chamber.

4. A brake system as claimed in claim 1 wherein the lockable non-return valves each contain a ball-type seat valve whose valve ball is acted upon in the closing direction by a stepped locking piston having a larger piston front face acted upon in the locking direction, the larger piston face having a size larger than the effective valve seat surface.

* * * * *